United States Patent
Richman

[15] 3,693,825
[45] Sept. 26, 1972

[54] FUEL TANK HAVING BELLOWS FOR CONTROL OF FUEL EVAPORATION

[72] Inventor: Douglas A. Richman, Detroit, Mich.
[73] Assignee: General Motors Corporation, Detroit, Mich.
[22] Filed: June 28, 1971
[21] Appl. No.: 157,225

[52] U.S. Cl. ...............................220/26 R, 220/85 B
[51] Int. Cl. .............................................B65d 25/00
[58] Field of Search ..220/85 B, 85 VR, 85 VS, 26 R, 220/85 A

[56] References Cited

UNITED STATES PATENTS

| | | | |
|---|---|---|---|
| 2,074,959 | 3/1937 | Guest | 220/26 R X |
| 2,611,512 | 9/1952 | Fashay | 220/26 R X |
| 3,349,945 | 10/1967 | Baker | 220/26 R |
| 3,617,034 | 11/1971 | Skinner | 220/85 B X |
| 3,648,886 | 3/1972 | Pringle | 220/85 B |

FOREIGN PATENTS OR APPLICATIONS

| | | | |
|---|---|---|---|
| 630,430 | 11/1961 | Canada | 220/85 B |
| 1,116,444 | 5/1956 | France | 220/26 R |

*Primary Examiner*—M. Henson Wood, Jr.
*Assistant Examiner*—Edwin D. Grant
*Attorney*—E. W. Christen et al.

[57] ABSTRACT

The exterior and interior of bellows expansible with the level of fuel in an automotive fuel tank divide the space in the tank above the fuel into a vapor space and a trap space. One end of the bellows is affixed to the roof of the tank and the other end to an insulator that covers substantially the entire surface of the fuel and floats on it. A conduit connects the vapor space to the trap space and has a flow restriction sufficient to retard diffusion between the spaces. Purge means are connected to communicate with the trap space.

3 Claims, 1 Drawing Figure

PATENTED SEP 26 1972 3,693,825
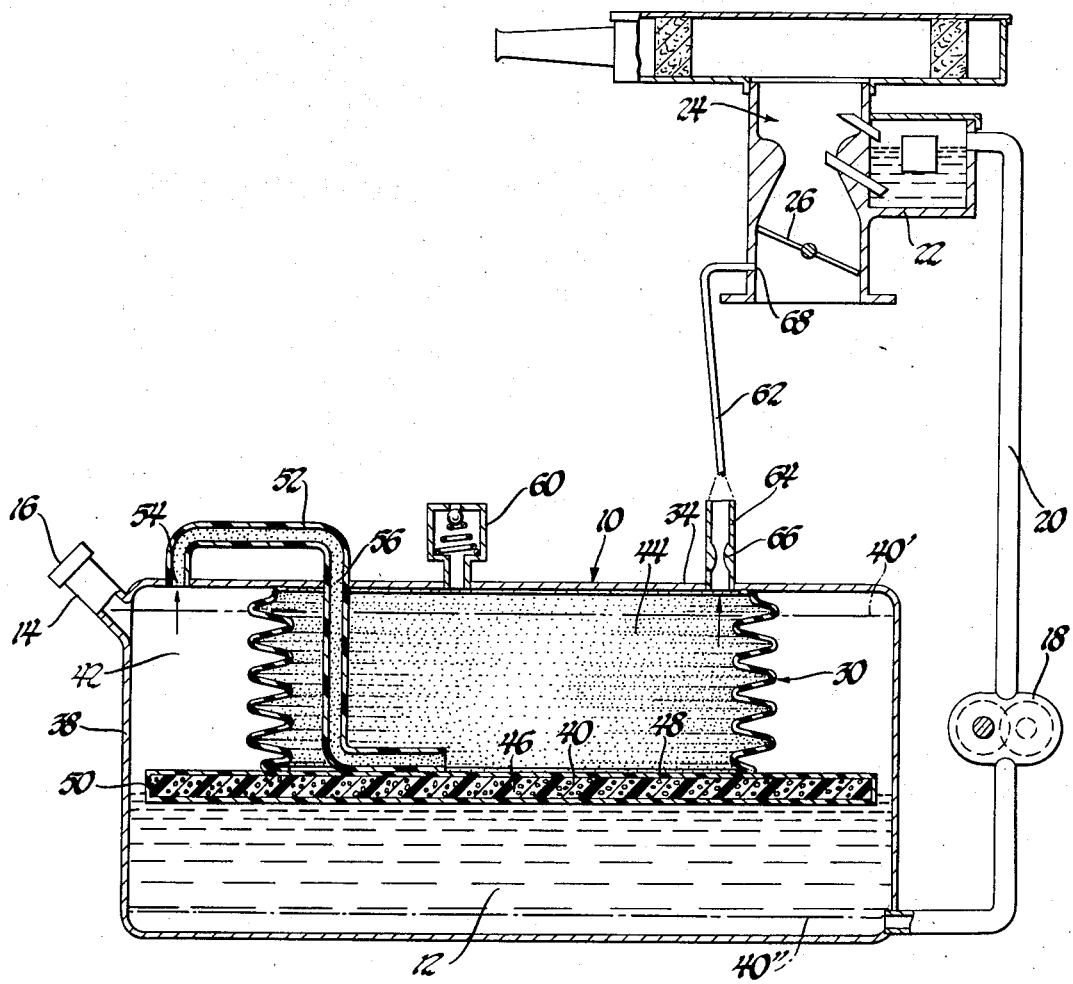
INVENTOR.
Douglas A. Richman
BY
Ronald L. Phillips
ATTORNEY

FUEL TANK HAVING BELLOWS FOR CONTROL OF FUEL EVAPORATION

This invention relates to an automotive fuel tank particularly of the type containing emission control means.

The present invention reduces the rate that fuel vapors are expelled from an automotive fuel tank by providing expansible bellows the exterior and interior walls of which divide the space in the tank above the fuel into a vapor space and a trap space that is made as large as possible with respect to the vapor space. One end of the bellows is sealed to and depends from the roof of the fuel tank, and, to vary the volume occupied by the bellows with the level of the fuel in the tank and to reduce the rate at which heat flows from the fuel to the vapor space, the other end of the bellows is connected to a floating insulator that covers substantially the entire surface area of the fuel. Fuel evaporated into and expanded in the vapor space with increasing temperature is transferred to the trap space through a conduit providing a flow restriction sufficient to retard diffusion. The fuel vapors collected in the trap space when the engine is not in operation are purged by providing a conduit that connects the trap space to the carburetor of the engine and a vacuum relief valve that prevents the emission of fuel vapors from the trap space but admits air for pressure compensation.

It is therefore a primary object of this invention to provide a new and improved automotive fuel tank for reducing the rate at which fuel vapors are emitted.

It is another primary object of the present invention to provide an automotive fuel tank containing chamber means the exterior of which occupies a substantial portion of the space above the fuel and the interior of which traps and collects fuel evaporated into, expanded within, and expelled with increasing temperatures from the vapor space remaining about the exterior.

It is a further object of the present invention to provide in an automotive fuel tank a chamber means of the foregoing type wherein the rate that heat is transferred from the fuel to the vapor space is retarded by a floating insulator that also varies the volume of the vapor space and trap space with the level of the fuel.

It is another object of the present invention to provide in an automotive fuel tank an expansible chamber of the foregoing type in which the trap space communicates with the atmosphere through vacuum relief means that effect pressure compensation as the tank empties and that cooperates with purge means to effect removal of fuel vapors collected in the trap space.

It is another object of the present invention to provide a fuel tank having chamber means of the foregoing type wherein the fuel vapors expanded in the vapor space about the exterior of the chamber are conveyed to the trap space in the interior through conduit means providing a flow restriction for retarding diffusion of fuel vapors from the vapor space to the trap space.

For a better understanding of the invention, as well as other objects and further features thereof, reference is had to the following detailed description to be read in conjunction with the accompanying single drawing showing a diagrammatic view.

With reference now to the drawing, there is shown for use in a motor vehicle a fuel tank 10 containing a liquid fuel 12 filled through a filler pipe 14 that is normally closed by a non-vented cap 16 having suitable vacuum relief means (not shown) to effect pressure compensation as the fuel tank empties. Fuel 12 is pumped by a fuel pump 18 through a fuel line 20 to a fuel bowl 22 of a carburetor 24 having a throttle valve 26.

Located within fuel tank 10 above fuel 12 is a cylindrically-shaped bellows 30, one end of which depends from and is sealingly affixed to roof 34 of fuel tank 10 and the other end of which is raised and lowered by and sealingly affixed to a float 40 made of heat insulating material that is in contact with substantially the entire surface of fuel 12. The space below roof 34 and above the existing level of fuel 12 and float 40 is divided into a small vapor space 42 defined about the exterior of the bellows and a large trap space 44 defined by the interior of the bellows. These spaces are expanded and contracted by float 40 between a filled position 40' and an empty position 40'' as it follows the level of fuel 12. Vapor space 42, to reduce the mass of fuel vapors that it may contain at equilibrium, is made as small as possible while still permitting the necessary filling, venting, purging, etc., recognizing also that the mass rate of fuel evaporation is proportional to the available vapor volume. Trap space 44, on the other hand, is made as large as possible in order to make vapor space 42 as small as possible and also to be able to collect as large a volume of fuel vapor as possible.

Bellows 30 is made of a material such as polyethylene that is both impervious to fuel 12 and readily flexible with the level thereof to permit unrestricted expansion contraction as float 40 moves between positions 40' and 40''. Float 40 is made of material having a low heat transfer coefficient such as polyurethane foam 46 which is laminated between two layers 48 such as sheets of heat sealed polyethylene film to render foam 46 impervious to fuel 12. Such heat insulation retards the fuel evaporation rate by retarding the rate of temperature increase of vapor space 42 below that of liquid fuel 12. Location of float 40 at the interface between vapor space 42 and liquid fuel 12 is also important because it has been found that most of the heat required to raise the temperature of vapor space 42 is transferred from liquid fuel 12 which in turn receives the heat by radiation from the surface of the road. Moreover, to minimize the rate of temperature increase of vapor space 42 is relative to that of liquid fuel 12, float 40 is made to cover as much of the surface area of fuel 12 as possible. Side 50 of float 40 is therefore contoured to correspond with the interior side 38 or tank 10, leaving just enough space therebetween to permit tank 10 to be filled and float 40 to move freely.

To permit fuel evaporated from fuel 12 and expanded in vapor space 42 with increasing temperature to be expelled therefrom and collected in trap space 44, a conduit 52 is provided, here in roof 34, to communicate between an outlet port 54 from vapor space 42 and an inlet port 56 to trap space 44. The difference in the pressure of the fuel vapors in vapor space 42 over that of the vapors in the trap space 44 caused by the difference in vapor concentrations provides a pressure differential sufficient to cause flow through conduit 52. However, to retard fuel evaporated into vapor space 42 from diffusing too rapidly into trap space 44 with the result that spaces 42 and 44 comprise essentially one volume, conduit 52 is of a length and diameter effective to provide a flow restriction substantially retarding such diffusion. To retard diffusion within and from trap space 44, fuel vapors collected therein are conducted to the bottom thereof adjacent float 40 and below the lighter air by a tube 58 connected to inlet port 56. To assure that the vapors expelled from vapor space 42 are always communicated to the bottom of trap space 44, tube 58 is made of a flexible material and of length in excess of the difference between the filled and unfilled positions 40' and 40'' of float 40.

Vacuum-relief means in the form of a check valve 60 connects trap space 44 to the atmosphere through roof 34 to admit air for purging trap space 44 as well as allowing it to be expanded by float 40 between the filled and empty positions 40' and 40''. Cooperating with vacuum-relief valve 60 for purging trap space 44 is a purge tube 62 connected between a purge port 64 having a flow restriction 66 therein and a vacuum port 68 below throttle valve 26 of carburetor 24. Should a sufficient volume of vapors be conveyed to trap space 44 to fill it after first driving off the lighter air, flow restriction 66 would thereafter retard the rate that fuel vapors might be emitted. With subsequent operation of the engine, a pressure differential is created between trap space 44 and vacuum port 68 to cause first any air at the top of trap space 44 and then fuel vapors at the bottom to be drawn into carburetor 24. Should it be desirable to maintain the air-fuel ratio effected by the carburetor precisely during such purging, a purge system may be used such as that shown in the United States patent application, Ser. No. 863,955 entitled "Fuel Tank Purge System and Method," filed Oct. 6, 1969 by Donald D. Stoltman, and assigned to the assignee of the present application.

By collecting and weighing the fuel vapors emitted from a vent port during several 1 hour tests on a conventional 20 gallon fuel tank filled with 8 gallons of a conventional test fuel while the fuel was heated from 60° F to 84° F, a 40 percent reduction in the mass of fuel vapors evaporated was observed where a ten gallon bellows merely occupied the space above the fuel but did not collect the vapors. With an insulator attached to the bellows, the temperature increase of the vapor space was 6° F less than that without the insulator and effected a 70 percent reduction in the mass of fuel evaporated into the vapor space. When the vapor space was connected to the trap space and the vapors emitted from the top thereof during the hour test were weighed, the overall reduction in the mass of fuel emitted from the tank was observed to be 96 percent.

While quarter inch flexible tubing was used to connect the vapor space to the trap space in these tests, it is contemplated that the invention could be practiced with pipes as large as one inch in diameter and as short as two inches. Suitable dimensions may be computed for retarding diffusion from the formula:

$wt = DATC/L$ where $wt$ is the weight diffused from a space of one concentration to a space of another concentration, $D$ is the coefficient of diffusion for the gas being diffused, $A$ is the interface area between the two spaces, $T$ is the time during which the diffusion is measured, $C$ is the difference in concentrations between the two spaces, and $L$ is the length of the conduit connecting the two spaces. From this formula, it has been computed that 8 grams of hydrocarbon vapors having a diffusion coefficient of 0.1 cm²/sec. at 70° F would diffuse in 1 hour through a pipe 2 inches long and 1 inch in diameter between a 2 gallon vapor space completely saturated with the fuel vapors and a 10 gallon trap space initially containing no vapors. This would amount to a diffusion of 4 gallons into a 10 gallon bellows over an hour and would leave ample volume to collect the fuel evaporated into, expanded within, and expelled from the vapor space with a temperature increase from 70° F to 84° F.

Having described one embodiment of the present invention it is understood that the specific terms and examples are employed in a descriptive sense only and not for purposes of limitation. Other embodiments of the invention, modifications thereof, and alternatives thereto may be used. I therefore aim in the appended claims to cover such modifications and changes as fall within the true spirit and scope of my invention.

What I claim as new and desire to secure by Letters Patent of the United States is:

1. An automotive fuel tank for an internal combustion engine comprising:
   a. expansible chamber means within said tank for dividing the space above the existing fuel level into a vapor space and a trap space;
   b. conduit means for conveying fuel vapors from said vapor space to said trap space;
   c. insulator means floating on the fuel for retarding the rate of temperature increase of said vapor space relative to that of said fuel; and
   d. purge means for removing fuel vapors collected in said trap space and for allowing the volume of said trap space to vary with the fuel. 2/sec.

2. An automotive fuel tank containing fuel for an internal combustion engine comprising:
   a. expansible chamber means within said fuel tank for dividing the space in said tank above said fuel into a vapor space and a trap space;
   b. conduit means for conveying fuel vapors from said vapor space to said trap space while also retarding diffusion of fuel vapors from said vapor space to said trap space;
   c. floatable insulator means in floating on said fuel and affixed to said chamber means for varying the volume of said vapor space and said trap space with changes in the level of said fuel and for reducing the rate that heat is transferred from said fuel to said vapor space; and
   d. purge means for removing fuel vapors collected in said trap means and for allowing said volume of said trap space to vary with the level of said fuel.

3. An automotive fuel tank containing fuel for an internal combustion engine comprising:
   a. variable volume chamber means affixed to the interior of said fuel tank for occupying a large portion of the space above the surface of said fuel, the small remaining portion of said space defining a vapor space into which fuel can evaporate from said fuel, said chamber means having a trap space therein;
   b. conduit means for conveying fuel vapors from said vapor space to said trap space, said conduit means providing a flow restriction for retarding diffusion of fuel vapors from said vapor space to said trap space;

c. floatable insulator means floating on said fuel and sealably affixed to said chamber means for varying the volume of said vapor space and said trap space with changes in the level of said fuel and for reducing the rate that heat is transferred from said fuel to said vapor space; and d. purge means for removing fuel vapors collected in said trap space and for allowing said volume of said trap space to vary with said level of said fuel.

* * * * *

PO-1050
(5/69)

UNITED STATES PATENT OFFICE
CERTIFICATE OF CORRECTION

Patent No. 3,693,825　　　　　　　　Dated　September 26, 1972

Inventor(s)　Douglas A. Richman

It is certified that error appears in the above-identified patent and that said Letters Patent are hereby corrected as shown below:

Column 2, line 50, "or" should read -- of --. Column 4, line 34, delete "2/sec".

Signed and sealed this 29th day of May 1973.

(SEAL)
Attest:

EDWARD M. FLETCHER, JR.　　　　　　ROBERT GOTTSCHALK
Attesting Officer　　　　　　　　　Commissioner of Patents